Sept. 20, 1960 C. T. RESSLER ET AL 2,953,000
DRIVE SHAFT AND SHIELD ASSEMBLY
Filed Nov. 19, 1958
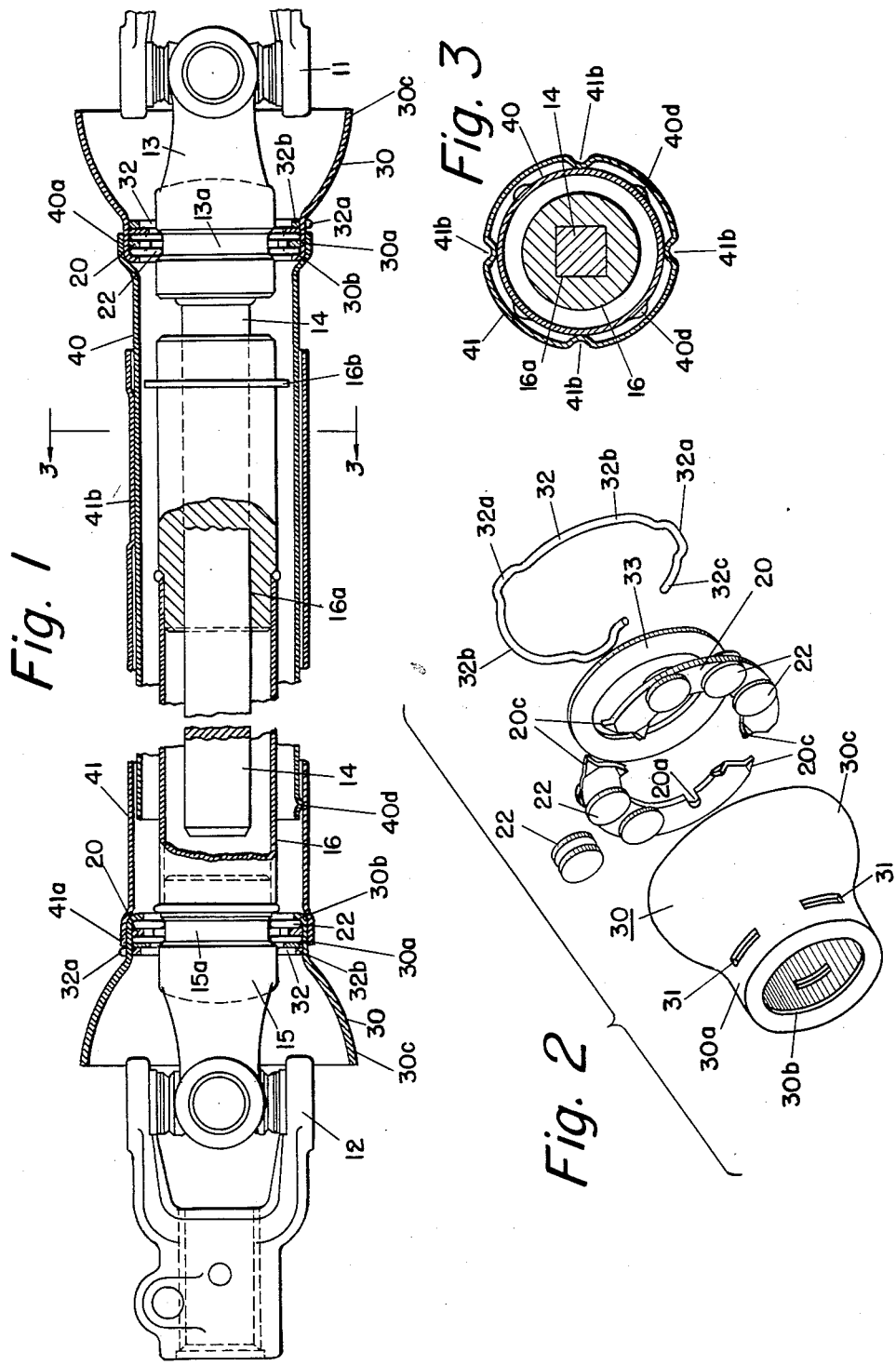

United States Patent Office 2,953,000
Patented Sept. 20, 1960

2,953,000

DRIVE SHAFT AND SHIELD ASSEMBLY

Carl T. Ressler and Harold R. Diffenderfer, Pottstown, Pa., assignors to Neapco Products Inc., Pottstown, Pa., a corporation of Delaware Filed Nov. 19, 1958, Ser. No. 774,934

2 Claims. (Cl. 64—4)

This invention relates to a drive shaft and shield assembly and has for an object the provision of a safety shield for housing a rotating shaft and universal joint mechanism.

It is the practice in the farm equipment industry to provide drive shafts or take-off shafts from tractors for transmission of power to other farming equipment. Such drive shafts include a pair of universal joints for connecting the power take-off shaft of the tractor with the driven shaft of the auxiliary farming apparatus. The present invention provides a safety shield of novel construction for housing the universal joint connection and preventing the operator from being accidentally injured by the rotating shaft.

In accordance with the present invention there is provided a drive shaft and shield assembly of rugged construction and including an easily-assembled and disassembled bearing arrangement between the shaft and the shield whereby the latter may be held stationary while the shaft continues to rotate. More specifically, the drive shaft and shield assembly include a bell-shaped member having a cylindrical portion terminating at one end in a shoulder for receiving a bearing assembly and terminating at the other end in a flared portion for shielding a universal joint. The cylindrical portion is provided with a plurality of spaced, elongated slots adjacent the flared end which are adapted to receive curved, projecting portions of a snap ring. The projecting portions of the snap ring are interconnected by arcuate sections which provide an abutment and, in cooperation with the shoulder portion of the bell-shaped member, provide an outer race for a roller-bearing assembly. The outer surface of the cylindrical portion has secured thereto a tubular section for shielding the portion of the shaft between the pair of universal joints. A second tubular member is adapted to be telescopically received by the first tubular member and the outer end of the second tubular member is secured to an identical end bell for shielding the other universal joint. Both end bells and bearings, therefore, are of identical construction and thus the cost of forming dies and the number of replacement parts is substantially reduced over prior art arrangements.

For further objects and advantages reference may be had to the following description taken in conjunction with the accompanying drawings in which:

Fig. 1 is a longitudinal view, partly in section, of the drive shaft and shield assembly embodying the present invention;

Fig. 2 is an exploded view of a bearing assembly; and

Fig. 3 is a sectional view taken along the plane 3—3 in Fig. 1.

Referring to Fig. 1, there is shown a pair of universal joints 11 and 12, one of which is adapted to be connected to the power take-off shaft from the source of power and the other of which is adapted to be connected to the shaft of the driven apparatus. Universal joint 11 includes a yoke member 13 to the inner end of which is secured a solid shaft 14 which is rectangular in cross section. The other universal joint 12 includes a fork or yoke member 15 to the inner end of which is secured a tubular member 16 having a rectangular, axial passage 16a therethrough which is adapted to receive the rectangular member 14. The members 14 and 16 provide the drive connection between the universal joints 11 and 12.

The yoke member 13 is provided with a groove 13a which forms the inner race for a bearing assembly. The yoke member 15 likewise is provided with a similar groove 15a to provide the inner race of a similar bearing assembly.

As may be seen in Fig. 2, each of the bearing assemblies includes a pair of retainers 20 which are flat, washer-like members, semi-circular in shape, and having a series of notches 20a extending from their inner circumferences to receive the grooved cylindrical roller bearings 22. The retainers 20 with the roller bearings 22 assembled therein as shown in Fig. 2 are adapted to be inserted in the respective grooves 13a and 15a of the respective yoke members 13 and 15, Fig. 1. As may be seen in Fig. 2, the abutting ends of the semi-circular retainers 20 have their corners 20c alternately bent out of the plane of the remainder of the retainers at an angle about 15° to provide abutments of greater thickness at the ends of the retainers 20. When the two halves of the retainer are assembled, the ears 20c on one half project to one side whereas the mating ears on the other half of the retainer 20 project to the other side. The semi-circular retainers 20 can be made on the same die, but when they are assembled, one is assembled in reverse position with respect to the other. By this construction the abutting ends of the semi-circular retainers 20 are prevented from overlapping each other and will maintain their abutting relationship and prevent the bearings from binding or becoming jammed in the assembly.

Each end of the shield assembly is provided with a bell-shaped member 30 having a cylindrical portion 30a terminating at one end in a shoulder 30b for receiving a bearing assembly and terminating at the other end in a flared portion 30c for shielding one of the universal joints. As may be seen in Fig. 2, the cylinder portion 30a is provided with a plurality of spaced elongated slots 31 adjacent the flared end 30c of the bell-shaped member 30. As illustrated, the preferred embodiment employs three equally-spaced slots 31 which are adapted to receive curved projecting portions 32a of a snap lock ring or retaining ring 32. The slots 31 extend completely through the sheet metal from which the bell-shaped member 30 is formed and the projecting portions 32a of the snap lock ring 32 are of sufficient size to extend through the slots 31 and project exteriorly of the outer surface of the bell-shaped member 30. The projecting portions 32a of the snap lock ring 32 are interconnected by a pair of arcuate sections 32b, the third arcuate section 32b being split at 32c to permit the ring 32 to be deformed for assembly within the bell-shaped member 30.

As may be seen in Fig. 1, the grooves 13a and 15a provide the inner race for the bearing assemblies. The outer race for each bearing assembly is provided by the cylindrical portion 30a and the outer periphery of the bearings are held in the outer race by the shoulder 30b at the inner end of the bell-shaped members 30 and the arcuate sections 32b of the snap lock ring 32. To provide an additional abutment surface for the roller bearings 22 and prevent the entry of dirt there is provided a washer member 33 which is disposed between the snap lock ring 32 and the adjacent ends of the roller bearings 22.

As thus far described, it will be noted that both of the bell shield members 30 and associated bearing assemblies at the respective ends of the shaft shield assembly are identical in construction. Thus the parts are fully interchangeable and the cost of forming dies and the number of replacement parts required is substantially reduced over prior arrangements. By employing slots of substantial length which extend completely through the bell member 30, the snap ring 32 likewise can be provided with projecting portions of substantial size for extension into the slots 31, thus insuring a rugged construction for retaining the roller bearings 22 in their races, but at the same time permitting ease of assembly and disassembly either at the factory or in the field.

For shielding the portion of the shaft between the pair of universal joints 11 and 12, the outer surface of the cylindrical portions 30a of the bell member 30 has secured thereto one of the respective tubular members 40 and 41. As shown in Fig. 1, the tubular member 40 is of smaller diameter than tubular member 41 and thus is adapted to be telescopically received within the member 41. One end of the tubular member 40 is provided with a portion 40a of enlarged diameter which is adapted to extend over the cylindrical portion 30a of the adjacent bell member 30 and be secured thereto in suitable manner as by spot welding. The tubular member 41 likewise is provided with a portion of enlarged diameter 41a which is adapted to extend over the cylindrical portion 30a of the adjacent bell member 30 and be secured thereto as by welding or brazing.

Since the length of shaft between the universal joints 11 and 12 will vary for different applications, it will of course be understood that the length of the telescopic tubes 40 and 41 likewise will vary for corresponding applications. For example, for some installations the overall length of one of the tubular members 40 or 41 and its respective bell member 30 has been as short as about 11″ while for some installations the overall length has been approximately 5′. In view of this, it will be seen that the amount of overhang of the tubular members 40 and 41 from their point of attachment to the respective end bells 30 is substantial and since the outer or open ends of the tubular members 40 and 41 are unsupported, the tubular members 40 and 41 will engage each other and rattle. In order to reduce the noise, it has been the practice in prior arrangements to make the tubular members 40 and 41 as near as possible to the same size while permitting one tube to be received within the other. This tends to reduce the noise and at the same time aids in keeping dirt from entering the interior of the drive shaft and shield assembly. However, such arrangement has the substantial disadvantage that after the assembly has been in use and subject to weather conditions, the two telescopic tubes tend to rust and become locked together thereby preventing any telescopic movement between the tubes. Under such conditions, disassembly of the tubes 40 and 41 is practically impossible without destroying the tubes.

In accordance with the present invention, the telescopic tubes 40 and 41 are maintained in spaced relation by a series of grooves or flutes which are distributed around the tubular members and extend lengthwise thereof providing line contact between the tubes 40 and 41 at spaced intervals. For example, as may be seen in Fig. 3, the outer tubular member 41 is provided with four equally spaced flutes or grooves 41b which extend axially of the tube 41. The raised portions 41b are adapted to engage the adjacent cylindrical surface of tubular member 40 and thus provide line contact between tubular members 40 and 41 through the approximate length of the grooves 41b. With this arrangement, the rattling or noise due to engagement between the tubular members 40 and 41 is minimized and since there is only a relatively short line contact at four locations around the circumferences of the tubular members, it is relatively easy to separate the tubular members 40 and 41 even under rusting conditions. To aid the grooves 41b in maintaining spaced relation between the tubular members 40 and 41, the inner tube 40 is provided with raised dimples 40d at four positions equally spaced around the tube 40 and close to the end which is telescoped within the outer tube 41. The raised dimples 40d are at locations staggered with respect to the grooves 41b and provide point contact at four locations around the circumferences of the tubular members 40 and 41, Fig. 3. As in the case of the grooves 41b, the dimples 40d help to minimize the noise due to vibration between the tubular members 40 and 41 and in view of their point contact between the tubular members they present no problem of separation even under rusting conditions. The dimples 40d are particularly advantageous for shield tubes which exceed about two feet in length when the assembly is operating near its closed length.

While the grooves 41b have been shown as extending inwardly for engagement with the outer surface of tubular member 40, it is of course understood that the grooves might be provided in the inner tube 40 and extend outwardly into engagement with the interior surface of the outer tube 41. It is also to be understood that grooves may be provided in both members 40 and 41 if desired. The grooves 41b in the outer tubular member 41 are preferred, since they are relatively simple to form. It will be noted that the grooves 41b are located closely adjacent the open ends of the tube. The length of the grooves 41b may vary; however, grooves approximately 4″ in length have proved satisfactory for tubes which vary in length from approximately 1′ to 5′.

To prevent the tubular members 40 and 41 from being bent into engagement with the rotating shaft members, and to help support any heavy static loads that may occur, such as a person stepping on the shield structure when at rest to climb up to the tractor, there is provided a supporting ring 16b which is secured to and adapted to project about the outer surface of member 16. The projecting structure 16b extends to a position close to the inner surface of tubular guard member 40 and thus when an external force is applied to the guard structure, the tube will only deflect until it engages the support 16b. This prevents the guard structure from being bent into engagement with the drive shaft members 14 and 16 and prevents the drive shaft and shield assembly from becoming jammed.

What is claimed is:

1. A drive shaft and shield assembly comprising a shaft, a groove on said shaft and extending therearound providing an inner bearing race, a tubular shield member encircling said shaft and including a cylindrical portion in axial alignment with said groove, said cylindrical portion of said tubular shield member terminating at one end in a shoulder and providing an outer race for a bearing assembly, said cylindrical portion having a plurality of spaced elongated slots disposed at the opposite end of said cylindrical portion from said shoulder, a plurality of roller bearings disposed within said groove between said shaft and said cylindrical portion of said tubular shield member, a split snap lock ring having projecting portions which extend through said elongated slots, said projecting portions being interconnected by arcuate portions which cooperate with said shoulder to retain said bearings within said inner and outer races, a second shaft having a groove therein to provide an inner bearing race, structure on said shafts for interlocking said shafts, a bearing assembly and tubular shield member associated with said groove in said second shaft and of similar construction with said bearing assembly and said tubular shield member associated with said first-named shaft, a pair of telescopically arranged tubes for housing said shafts, the outer ends of said telescopic tubes being secured respectively to said cylindrical portions of said tubular shield members, and structure on one of said shafts projecting outwardly therefrom to a position adjacent the inner one of said telescopic tubes, said projecting structure providing a guard for preventing said telescopic tubes from being bent into engagement with said shafts to avoid interference therewith.

2. A drive shaft and shield assembly comprising a shaft, a groove on said shaft and extending therearound providing an inner bearing race, a tubular shield member encircling said shaft and including a cylindrical portion in axial alignment with said groove, said cylindrical portion of said tubular shield member terminating at one end in a shoulder and providing an outer race for a bearing assembly, said cylindrical portion having a plurality of spaced elongated slots disposed at the opposite end of said cylindrical portion from said shoulder, a plurality of roller bearings disposed within said groove between said shaft and said cylindrical portion of said tubular shield member, a split snap lock ring having projecting portions which extend through said elongated slots, said projecting portions being interconnected by arcuate portions which cooperate with said shoulder to retain said bearings within said inner and outer races, said plurality of roller bearings being maintained within said groove by a pair of semi-circular retainers, said retainers having spaced notches therein to receive said roller bearings, the abutting ends of said retainers having portions projecting out of the plane of the remainder of said retainers to provide enlarged abutment surfaces at the abutting ends of said retainers to prevent said ends from moving into overlapping relation, and a washer member disposed between said lock ring and the adjacent ends of said roller bearings to provide an abutment surface for said roller bearings and prevent entry of dirt into said bearing assembly.

References Cited in the file of this patent

UNITED STATES PATENTS

| | | |
|---|---|---|
| 1,438,935 | Denyes | Dec. 12, 1922 |
| 2,772,550 | Harrington | Dec. 4, 1956 |
| 2,793,512 | Larsen | May 28, 1957 |
| 2,796,749 | Warner | June 25, 1957 |